(12) United States Patent
Najima

(10) Patent No.: US 9,806,661 B2
(45) Date of Patent: Oct. 31, 2017

(54) CONTROL DEVICE FOR ON-VEHICLE ELECTRIC COMPRESSOR

(71) Applicant: KABUSHIKI KAISHA TOYOTA JIDOSHOKKI, Kariya-shi, Aichi-ken (JP)

(72) Inventor: Kazuki Najima, Kariya (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 0 days.

(21) Appl. No.: 14/930,724

(22) Filed: Nov. 3, 2015

(65) Prior Publication Data

US 2016/0134226 A1    May 12, 2016

(30) Foreign Application Priority Data

Nov. 7, 2014    (JP) ................................. 2014-227143

(51) Int. Cl.
   *G05B 5/00*     (2006.01)
   *G05D 23/00*    (2006.01)
   (Continued)

(52) U.S. Cl.
   CPC ........ *H02P 29/0088* (2013.01); *H02P 29/032* (2016.02); *H02P 29/68* (2016.02);
   (Continued)

(58) Field of Classification Search
   CPC .. G06F 1/206; H02H 6/00; H02H 7/08; H02P 23/0072; B25F 5/00
   (Continued)

(56) References Cited

U.S. PATENT DOCUMENTS

| 5,936,820 A | * | 8/1999 | Umemura ............. B60L 3/0023 361/103 |
| 6,100,660 A | | 8/2000 | Ikeyama et al. |

(Continued)

FOREIGN PATENT DOCUMENTS

| JP | 10-201280 A | 7/1998 |
| JP | 2007-151318 A | 6/2007 |

(Continued)

OTHER PUBLICATIONS

Communication dated Feb. 9, 2017, issued by the German Patent and Trademark Office in corresponding German Application No. 10 2015 118 867.8.

*Primary Examiner* — Kawing Chan
*Assistant Examiner* — Bradley Brown
(74) *Attorney, Agent, or Firm* — Sughrue Mion, PLLC

(57) ABSTRACT

A control device for an on-vehicle electric compressor controls and drives an electric motor arranged in the on-vehicle electric compressor. The control device includes a temperature acquisition unit, a current detector, a threshold current value setting unit, and a motor current controller. The temperature acquisition unit acquires a temperature of the control device. The current detector detects a motor current, which is current that flows through the electric motor. The threshold current value setting unit sets a threshold current value in accordance with the temperature of the control device acquired by the temperature acquisition unit. The motor current controller controls the motor current based on a detection result of the current detector so that the motor current becomes less than or equal to the threshold current value.

4 Claims, 4 Drawing Sheets

(51) Int. Cl.
    *H02H 7/08*         (2006.01)
    *H02P 1/04*         (2006.01)
    *H02P 3/00*         (2006.01)
    *H02P 7/00*         (2016.01)
    *H02P 29/00*       (2016.01)
    *H02P 29/032*     (2016.01)
    *H02P 29/68*       (2016.01)
    *G06F 1/20*         (2006.01)
    *H02H 6/00*         (2006.01)

(52) U.S. Cl.
    CPC ............... *G06F 1/206* (2013.01); *H02H 6/00* (2013.01); *H02H 7/08* (2013.01)

(58) Field of Classification Search
    USPC ........................................................ 318/472
    See application file for complete search history.

(56) References Cited

U.S. PATENT DOCUMENTS

| | | |
|---|---|---|
| 8,777,585 B2 | 7/2014 | Nakano et al. |
| 2010/0172764 A1* | 7/2010 | Nakano ................. F04B 49/065 |
| | | 417/44.11 |

FOREIGN PATENT DOCUMENTS

| | | |
|---|---|---|
| JP | 2012-70530 A | 4/2012 |
| JP | 5039515 B2 | 10/2012 |

* cited by examiner

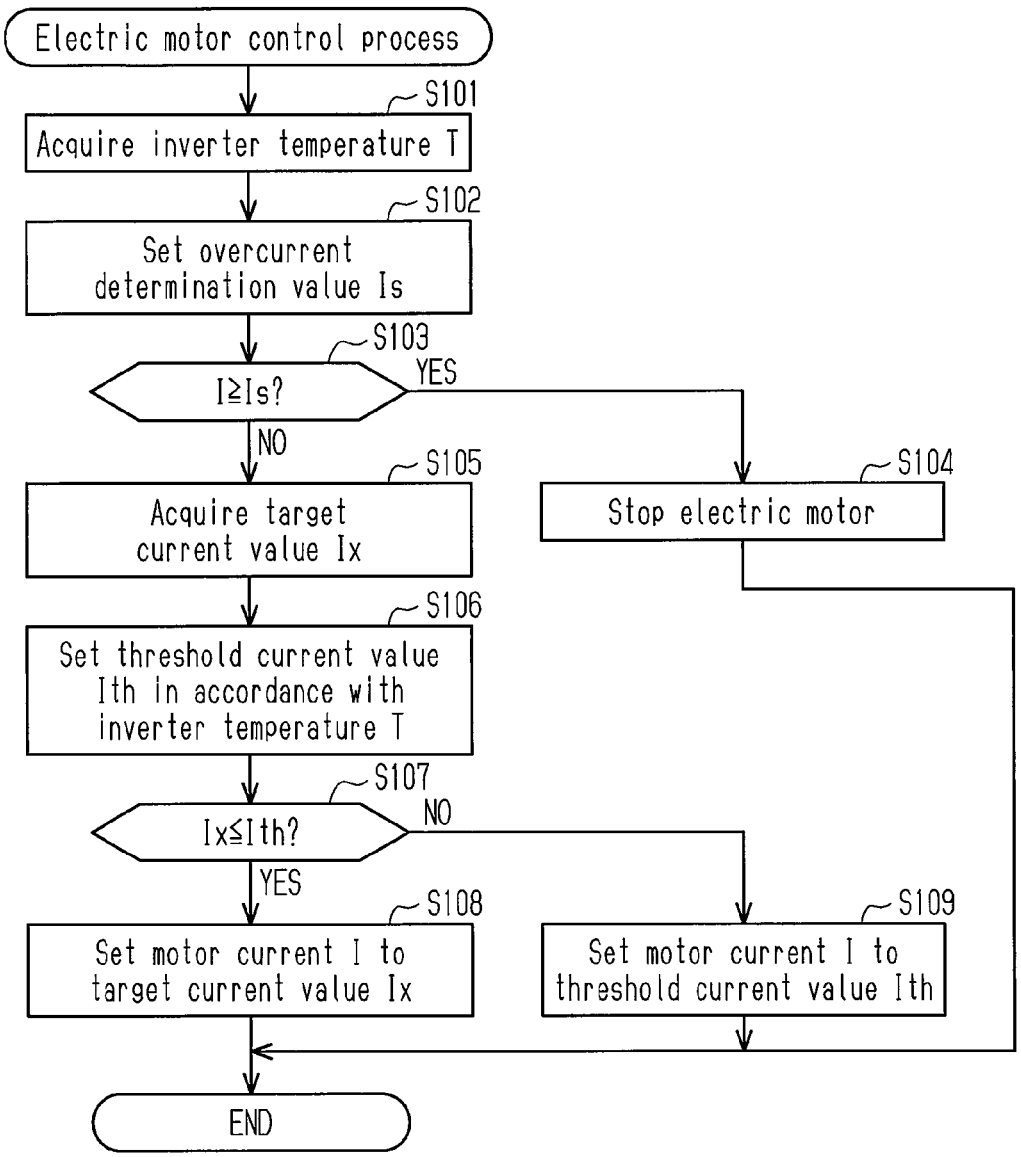

CONTROL DEVICE FOR ON-VEHICLE ELECTRIC COMPRESSOR

BACKGROUND OF THE INVENTION

The present invention relates to a control device for an on-vehicle electric compressor.

A control device for an on-vehicle electric compressor drives and controls an electric motor of the on-vehicle electric compressor. The control device, for example, compares current corresponding to a temperature detected by a temperature detector with current detected by a current detector and uses the comparison result to control the rotation speed of the electric motor (refer to, for example, Japanese Patent No. 5039515).

Motor current, which is output from the control device for the on-vehicle electric compressor, flows to the electric motor. When the motor current increases, the amount of heat generated when power loss occurs in the control device for the on-vehicle electric compressor is apt to increase.

The on-vehicle electric compressor and the control device for the on-vehicle electric compressor are installed in a vehicle. Thus, the control device for the on-vehicle electric compressor may be exposed to a high-temperature environment. When the motor current is high under such a high-temperature environment, the temperature of the control device for the on-vehicle electric compressor may become excessively high and adversely affect the drive-control of the electric motor.

To cope with such a problem, rotation speed control may be performed as described in the above publication. However, since the load torque of the on-vehicle electric compressor changes in accordance with the travelling conditions or the like of the vehicle, the motor current may differ even when the rotation speed is the same. Thus, the execution of rotation speed control may not be able to restrict overheating of the control device for the on-vehicle electric compressor. Accordingly, there is room for improvement in the structure that restricts overheating of the control device for the on-vehicle electric compressor.

SUMMARY OF THE INVENTION

It is an object of the present invention to provide a control device for an on-vehicle electric compressor that does not overheat and thus does not stop an electric motor as a result of overheating.

To achieve the above object, a control device for an on-vehicle electric compressor according to one embodiment of the present invention controls and drives an electric motor arranged in the on-vehicle electric compressor. The control device includes a temperature acquisition unit, a current detector, a threshold current value setting unit, and a motor current controller. The temperature acquisition unit acquires a temperature of the control device. The current detector detects a motor current, which is current that flows through the electric motor. The threshold current value setting unit sets a threshold current value in accordance with the temperature of the control device acquired by the temperature acquisition unit. The motor current controller controls the motor current based on a detection result of the current detector so that the motor current becomes less than or equal to the threshold current value.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 4 is a flowchart showing the electric motor control process;

DETAILED DESCRIPTION OF THE PREFERRED EMBODIMENTS

One embodiment of an on-vehicle electric compressor and a control device for the on-vehicle electric compressor will now be described. The on-vehicle electric compressor of the present embodiment is used for a vehicle air conditioner that is installed in a vehicle.

In the present embodiment, the on-vehicle electric compressor is installed in a vehicle that includes, for example, an engine. The on-vehicle electric compressor and the control device for the on-vehicle electric compressor are accommodated in the same area as the engine (e.g., front area of vehicle).

Figure 1:
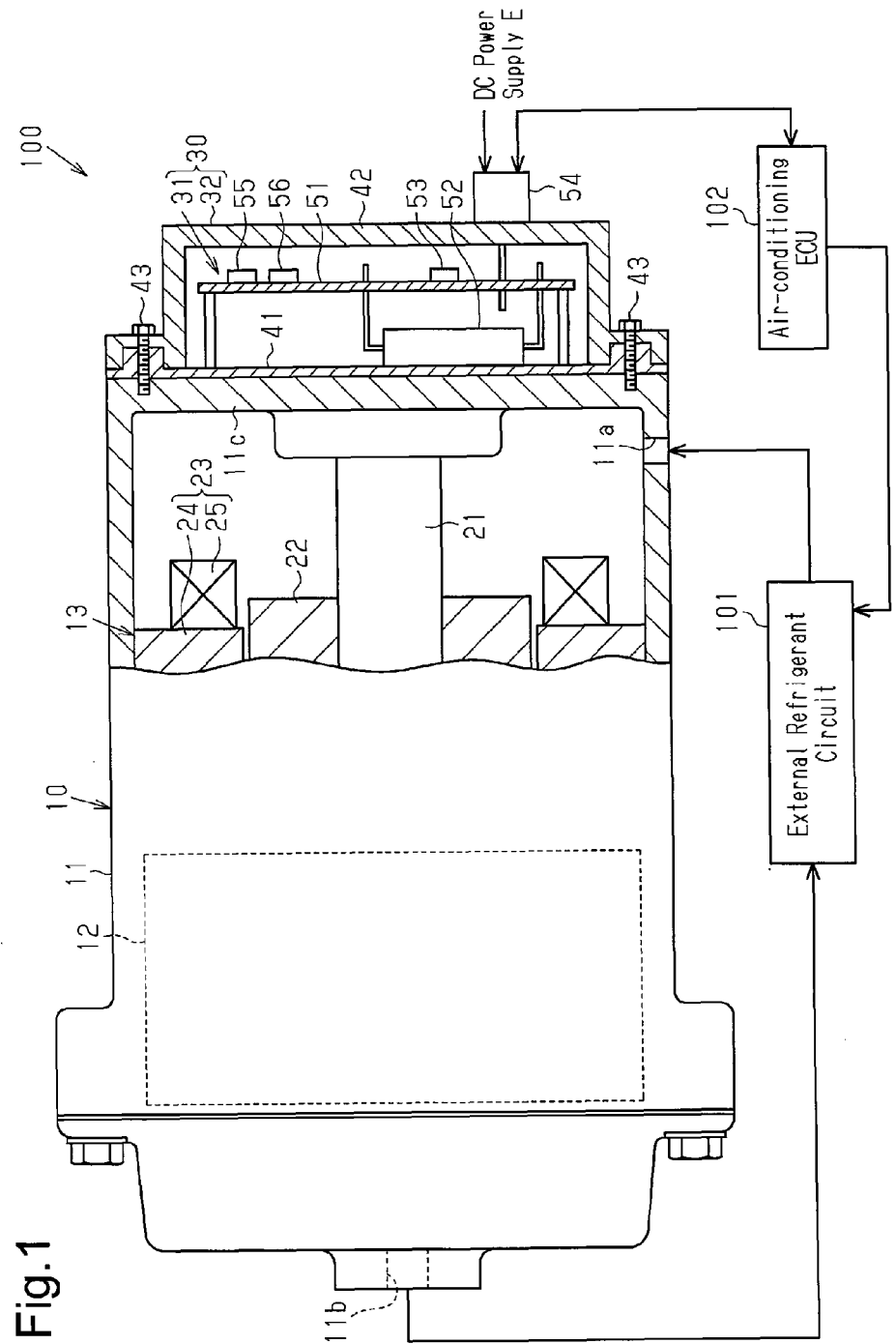
FIG. 1 is a schematic diagram showing a vehicle air conditioner according to one embodiment of the present invention.

As shown in FIG. 1, a vehicle air conditioner 100 includes an on-vehicle electric compressor 10 and an external refrigerant circuit 101, which supplies refrigerant to the on-vehicle electric compressor 10. The external refrigerant circuit 101 includes, for example, a heat exchanger and an expansion valve. The vehicle air conditioner 100 uses the on-vehicle electric compressor 10 to compress refrigerant and the external refrigerant circuit 101 to exchange heat with the refrigerant and expand the refrigerant. This cools and heats the passenger compartment.

The vehicle air conditioner 100 includes an air-conditioning ECU 102, which controls the entire vehicle air conditioner 100. The air-conditioning ECU 102 is configured to acquire, for example, the passenger compartment temperature and a preset temperature of the vehicle air conditioner. Based on these parameters, the air-conditioning ECU 102 transmits various instructions such as activation and deactivation instructions to the on-vehicle electric compressor 10.

The on-vehicle electric compressor 10 includes a housing 11, a compression unit 12, and an electric motor 13. The housing 11 includes a suction port 11a, which draws in refrigerant from the external refrigerant circuit 101. The compression unit 12 is accommodated in the housing 11.

The entire housing 11 is tubular and formed from a conductive material (e.g., metal such as aluminum). The housing 11 includes a discharge port 11b, which discharges refrigerant.

The compression unit 12 compresses refrigerant that is drawn through the suction port 11a into the housing 11. Then, the compression unit 12 discharges the compressed refrigerant from the discharge port 11b. The specific structure of the compression unit 12 may be of, for example, a scroll type, a piston type, or a vane type.

The electric motor 13 drives the compression unit 12. The electric motor 13 includes, for example, a cylindrical rotation shaft 21, a cylindrical rotor 22, and a stator 23. The rotation shaft 21 is rotationally supported by the housing 11. The rotor 22 is fixed to the rotation shaft 21. The stator 23 is fixed to the housing 11. The axial direction of the rotation shaft 21 conforms to the axial direction of the cylindrical housing 11. The stator 23 includes a cylindrical stator core 24 and a coil 25, which is wound around the teeth of the stator core 24. The rotor 22 opposes the stator 23 in a radial direction of the rotation shaft 21.

As shown in FIG. 1, the on-vehicle electric compressor 10 includes a control device 30, which drives and controls the electric motor 13. The control device 30 corresponds to "the control device for the on-vehicle electric compressor." The control device 30 includes an inverter 31 and a case 32. The inverter 31 serves as a drive control circuit that supplies power to the electric motor 13. The case 32 accommodates the inverter 31. The coil 25 of the electric motor 13 is connected to the inverter 31 by, for example, a connector (not shown).

The case 32 includes a base 41 and a cover 42. The base 41 has the form of a plate and is formed from a conductive material (e.g., metal such as aluminum). The cover 42, which has a closed end, is coupled to the base 41. The base 41 contacts the housing 11. More specifically, the base 41 contacts a wall 11c, which is one of the two axial end walls of the housing 11 located at the opposite side of the discharge port 11b. The base 41 is fixed to the housing 11 by bolts 43, which serve as fasteners. This couples the control device 30 (more specifically, case 32) to the housing 11. That is, the on-vehicle electric compressor 10 of the present embodiment is integrated with the control device 30.

The case 32 and the housing 11 contact each other and are thermally coupled. That is, the control device 30 is arranged at a location where the control device 30 is thermally coupled to the housing 11. The control device 30 is free from communication holes that communicate the interior of the case 32 with the interior of the housing 11. Thus, refrigerant does not directly flow into the case 32.

The inverter 31 includes, for example, a circuit board 51 and a power module 52. The circuit board 51 is fixed to the base 41. The power module 52 is electrically connected to the circuit board 51. Various electronic components and wiring patterns are arranged on the circuit board 51. For example, a temperature sensor 53 is mounted to measure the temperature in the case 32. A connector 54 is arranged on the outer surface of the cover 42 of the case 32. The connector 54 is electrically connected to the circuit board 51. The connector 54 supplies power from a DC power supply E, which serves as an external power supply, to the inverter 31. The connector 54 electrically connects the air-conditioning ECU 102 to the inverter 31.

Figure 2:
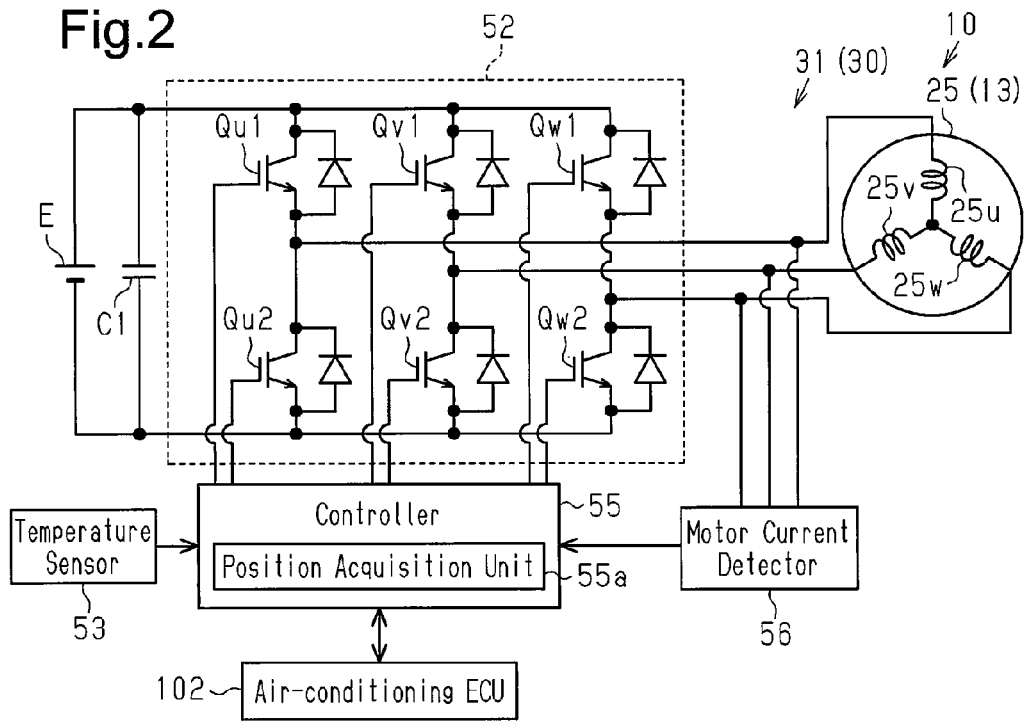
FIG. 2 is a circuit diagram of an inverter shown in FIG. 1.

As shown in FIG. 2, the coil 25 of the electric motor 13 has a three-phase structure that includes, for example, a u-phase coil 25u, a v-phase coil 25v, and a w-phase coil 25w. The coils 25u, 25v, and 25w form, for example, a Y-connection.

The power module 52 includes u-phase power switching elements Qu1 and Qu2, which correspond to the u-phase coil 25u, v-phase power switching elements Qv1 and Qv2, which correspond to the v-phase coil 25v, and w-phase power switching elements Qw1 and Qw2, which correspond to the w-phase coil 25w. Each of the power switching elements Qu1, Qu2, Qv1, Qv2, Qw1, and Qw2 (hereinafter referred to as power switching elements Qu1 to Qw2) is, for example, an insulated-gate bipolar transistor (IGBT).

The u-phase power switching elements Qu1 and Qu2 are connected to each other in series by a connection wire, which is connected to the u-phase coil 25u. A serial connector formed by the u-phase power switching elements Qu1 and Qu2 receives direct current power from the DC power supply E. Although the corresponding coils are different, the other power switching elements Qv1, Qv2, Qw1, and Qw2 are connected in the same manner as the u-phase power switching elements Qu1 and Qu2 and thus will not be described in detail. The inverter 31 includes a smoothing capacitor C1, which is connected in parallel to the DC power supply E.

The inverter 31 includes a controller 55, which controls the power module 52 (more specifically, switching operation of power switching elements Qu1 to Qw2). The controller 55 drives, that is, generates rotation with, the electric motor 13 by cyclically activating and deactivating the power switching elements Qu1 to Qw2.

As shown in FIG. 2, the control device 30 includes a motor current detector 56, which serves as a current detector. The motor current detector 56 detects motor current I, which is current that flows to the electric motor 13, and transmits the detection result to the controller 55. This allows the controller 55 to acquire the motor current I. The motor current I may be referred to as the output current of the inverter 31.

The controller 55 is electrically connected to the air-conditioning ECU 102. The air-conditioning ECU 102 sets a target rotation speed rt of the electric motor 13 based on, for example, the passenger compartment temperature and the preset temperature. Then, the air-conditioning ECU 102 transmits an instruction related to the target rotation speed rt to the controller 55. When the controller 55 receives an instruction related to the target rotation speed rt from the air-conditioning ECU 102, the controller 55 refers to the present load torque and sets the motor current I at which the rotation speed r of the electric motor 13 becomes equal to the target rotation speed rt as a target current value Ix. The controller 55 controls the motor current I to approach (preferably, conform to) the target current value Ix by variably controlling the motor current I (more specifically, activation and deactivation duty cycle of power switching elements Qu1 to Qw2) based on the detection result of the motor current detector 56.

Referring to FIG. 2, the temperature sensor 53 transmits the measurement result to the controller 55. The controller 55 acquires the temperature of the control device 30, which is based on the temperature measured by the temperature sensor 53, as the inverter temperature T.

In the present embodiment, the inverter temperature T is, for example, the temperature of the power module 52 (more specifically, power switching elements Qu1 to Qw2). More specifically, the controller 55 includes data that indicates the correlation of the measured temperature of the temperature sensor 53 and the temperature of the power module 52. The controller 55 refers to the data to acquire the temperature of the power module 52, which corresponds to the measured temperature of the temperature sensor 53, and sets the acquired temperature as the inverter temperature T. That is, the control device 30 uses the temperature sensor 53 to acquire the inverter temperature T, which serves as the temperature of the control device 30.

The inverter temperature T is not limited to the foregoing description and may be any temperature related to the control device 30. For example, the inverter temperature T may be the temperature directly measured by the temperature sensor 53, that is, the temperature in the case 32, or the temperature of another component mounted on the circuit board 51.

As shown in FIG. 2, the controller 55 of the control device 30 includes a position acquisition unit 55a. The position acquisition unit 55a estimates the counter-electromotive force generated in the electric motor 13 based on the applied voltage and the motor current I of the electric motor 13. Then, the position acquisition unit 55a acquires the rotational position of the rotor 22 based on the estimated counter-electromotive force. The controller 55 controls activation and deactivation of the power switching elements Qu1 to Qw2 based on the rotation speed of the rotor 22, which is acquired by the position acquisition unit 55a.

Since the on-vehicle electric compressor 10 is installed in a vehicle, the load torque applied to the electric motor 13 changes in accordance with, for example, the travelling condition and the surrounding environment of the vehicle. Even when the rotation speed r of the electric motor 13 is the same, the target current value Ix differs in accordance with the load torque. Accordingly, even when the rotation speed r of the electric motor 13 is relatively low, the motor current I may increase depending on the load torque. In such a case, an increase in the amount of heat generated by the control device 30 (more specifically, power module 52) increases the inverter temperature T. This may adversely affect the drive-control of the electric motor 13. Further, when the motor current I, which is the output current of the inverter 31, continues to be excessively high due to an abnormality, components of the inverter 31 such as the power module 52 may become defective.

The controller 55 of the present embodiment performs protection control so that the above situation does not occur. More specifically, the controller 55 is configured to control the motor current I to be less than or equal to a threshold current value Ith and to stop the electric motor 13 when the motor current I is greater than or equal to an overcurrent determination value Is.

Figure 3:
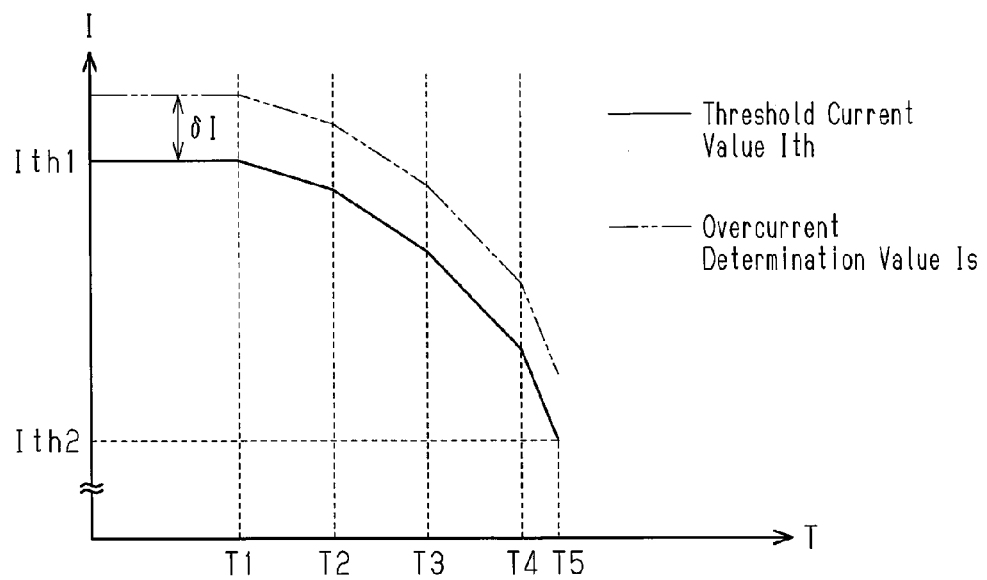
FIG. 3 is a graph showing the threshold current value and the overcurrent determination value relative to the inverter temperature.

The threshold current value Ith and the overcurrent determination value Is will now be described with reference to FIG. 3.

First, the threshold current value Ith will now be described. As shown by the solid line of FIG. 3, the threshold current value Ith is set to vary in accordance with the inverter temperature T. More specifically, when the threshold current value Ith is less than or equal to a predetermined first threshold temperature (threshold temperature) T1, the threshold current value Ith is set to a maximum threshold current value Ith1, which is a fixed value. When the threshold current value Ith is greater than the first threshold temperature T1, the threshold current value Ith is set to gradually decrease as the inverter temperature T increases.

A temperature range higher than the first threshold temperature T1 is divided into a range from the first threshold temperature T1 to a second threshold temperature T2, a range from the second threshold temperature T2 to a third threshold temperature T3, a range from the third threshold temperature T3 to a fourth threshold temperature T4, and a range from the fourth threshold temperature T4 to a fifth threshold temperature T5. The threshold current value Ith forms a straight line that has a different gradient in each range. More specifically, as the temperature range increases, the gradient of the threshold current value Ith increases.

The threshold current value Ith may take any specific numerical value. For example, the threshold current value Ith may be set in correspondence with the thermal properties of the components that form the inverter 31 (e.g., power module 52) and the inverter temperature T. For example, the threshold current value Ith may be set in correspondence with the amount of heat generation of the power module 52, the heat resistance of the power module 52, and the like when the motor current I is the threshold current value Ith so that an increase in the inverter temperature T is limited when the motor current I is the threshold current value Ith. The threshold current value Ith is set to decrease as the inverter temperature T approaches the heat withstanding temperature of the power module 52.

The fifth threshold temperature T5 is an inverter temperature T that corresponds to the minimum threshold current value Ith2. The minimum threshold current value Ith2 is, for example, the minimum motor current I that is required to drive the electric motor 13. Thus, when the inverter temperature T is greater than the fifth threshold temperature T5, the motor current I is less than the minimum threshold current value Ith2. In such a case, the electric motor 13 cannot be driven. When the inverter temperature T is greater than the fifth threshold temperature T5, the controller 55 stops the electric motor 13. In the present embodiment, the fifth threshold temperature T5 corresponds to a "stop trigger temperature," and the controller 55 corresponds to a "temperature stop controller."

The overcurrent determination value Is will now be described. As shown by the broken line in FIG. 3, the overcurrent determination value Is is set to be higher than the threshold current value Ith by a predetermined amount 61. In the present embodiment, the predetermined amount 61 is a fixed value that does not change in accordance with the inverter temperature T. When the inverter temperature T is less than or equal to the first threshold temperature T1, the overcurrent determination value Is is a fixed value (maximum value). When the inverter temperature T is greater than the first threshold temperature T1, the overcurrent determination value Is is set to decrease as the inverter temperature T increases in the same manner as the threshold current value Ith that decreases as the inverter temperature T increases. The overcurrent determination value Is is set based on, for example, the rated current value of the power module 52.

The controller 55 includes data that indicates the correlation of the inverter temperature T with the threshold current value Ith and the overcurrent determination value Is. The controller 55 refers to the data to set the threshold current value Ith and the overcurrent determination value Is in correspondence with the inverter temperature T.

The data may have any specific configuration. For example, the data may be map data that sets the threshold current value Ith corresponding to each of the threshold temperatures T1 to T5. In such a case, the controller 55 uses linear interpolation to set a threshold current value Ith and an overcurrent determination value Is that correspond to the inverter temperature T. More specifically, the controller 55 refers to the map data to identify the two threshold current values Ith corresponding to two threshold temperatures that define the upper limit value and the lower limit value of the temperature range including the acquired inverter temperature T. The controller 55 obtains a straight line from the two threshold current values Ith. Then, the controller 55 obtains and sets the threshold current value Ith corresponding to the inverter temperature T from the straight line. The controller 55 obtains and sets the overcurrent determination value Is by adding the predetermined amount 61 to the obtained threshold current value Ith. The data is not limited to the above configuration. The data may be function data.

The controller 55 uses the threshold current value Ith and the overcurrent determination value Is to restrict excessive heat generation and overcurrent of the inverter 31 and to execute an electric motor control process that has the motor current I approach the target current value Ix. The electric motor control process will now be described in detail with reference to FIG. 4. The electric motor control process is periodically executed in predetermined cycles when the electric motor 13 generates rotation.

As shown in FIG. 4, in Step S101, the controller 55 acquires the present inverter temperature T. More specifically, the controller 55 acquires the temperature measured by the temperature sensor 53. The controller 55 refers to the data that indicates the correlation of the measured temperature and the inverter temperature T to acquire the present inverter temperature T. The function of the controller 55 that executes the process of Step S101 corresponds to the function of a "temperature acquisition unit."

In Step S102, the controller 55 sets an overcurrent determination value Is corresponding to the inverter temperature T acquired in Step S101. The specific configuration for setting the overcurrent determination value Is and the threshold current value Ith corresponding to the inverter temperature T has been described above and thus will not be described in detail.

In Step S103, the controller 55 determines whether or not the present motor current I, which has been detected by the motor current detector 56, is greater than or equal to the overcurrent determination value Is, which has been set in Step S102.

When the motor current I is greater than or equal to the overcurrent determination value Is, the controller 55 gives an affirmative determination in Step S103 and proceeds to Step S104. In Step S104, the controller 55 stops the electric motor 13 and terminates the electric motor control process. The function of the controller 55 that executes the processes of steps S103 and S104 corresponds to the function of a "stop controller."

When the motor current I is less than the overcurrent determination value Is, the controller 55 gives a negative determination of Step S103. Then, in steps S105 to S109, the controller 55 controls the motor current I in accordance with the present situation (inverter temperature T).

More specifically, the controller 55 acquires the target current value Ix in Step S105. As described above, the target current value Ix is, for example, a parameter that is set in correspondence with the target rotation speed rt, which is instructed by the air-conditioning ECU 102, the load torque, and the like. The target current value Ix is not set in accordance with the inverter temperature T.

The target current value Ix may have been set in the previous electric motor control process. In such a case, in Step S105, when the target current value Ix acquired in the present electric motor control process differs from the target current value Ix acquired in the previous electric motor control process, the controller 55 updates the target current value Ix to the presently acquired target current value Ix. When the presently acquired target current value Ix is the same as the target current value Ix acquired in the previous electric motor control process, the controller 55 updates and maintains the previously acquired target current value Ix.

In Step S106, the controller 55 sets the threshold current value Ith in accordance with the inverter temperature T that has been acquired in Step S101. In Step S106, when the threshold current value Ith has been set in the previous electric motor control process, the controller 55 updates the threshold current value Ith set in the previous electric motor control process to the threshold current value Ith that is in accordance with the present inverter temperature T acquired by the current electric motor control device. The function of the controller 55 that executes the process of Step S106 corresponds to the function of a "threshold current value setting unit."

The controller 55 proceeds to Step S107 and determines whether or not the target current value Ix acquired in Step S105 is less than or equal to the threshold current value Ith set in Step S106.

When the target current value Ix is less than or equal to the threshold current value Ith, the controller 55 proceeds to Step S108. In Step S108, based on the detection result of the motor current detector 56, the controller 55 controls the motor current I to become equal to the target current value Ix. Then, the controller 55 terminates the electric motor control process.

When the target current value Ix is greater than the threshold current value Ith, the controller 55 proceeds to step S109. In Step S109, based on the detection result of the motor current detector 56, the controller 55 controls the motor current I to become equal to the threshold current value Ith. Then, the controller 55 terminates the electric motor control process.

More specifically, the controller 55 sequentially updates the target current value Ix and the threshold current value Ith. Further, when the target current value Ix is less than or equal to the threshold current value Ith, the controller 55 sets the target current value Ix to the motor current I. When the target current value Ix is greater than the threshold current value Ith, the controller 55 restricts the motor current I to the threshold current value Ith. The function of the controller 55 that executes the processes of steps S107 to S109 corresponds to the function of a "motor current controller."

Figure 5A:
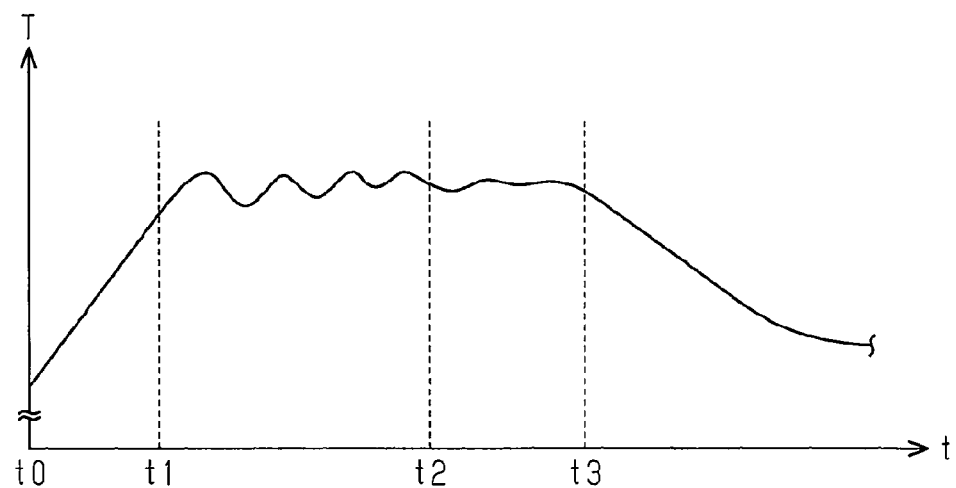
FIG. 5A is a schematic graph showing the inverter temperature relative to time.
Figure 5B:
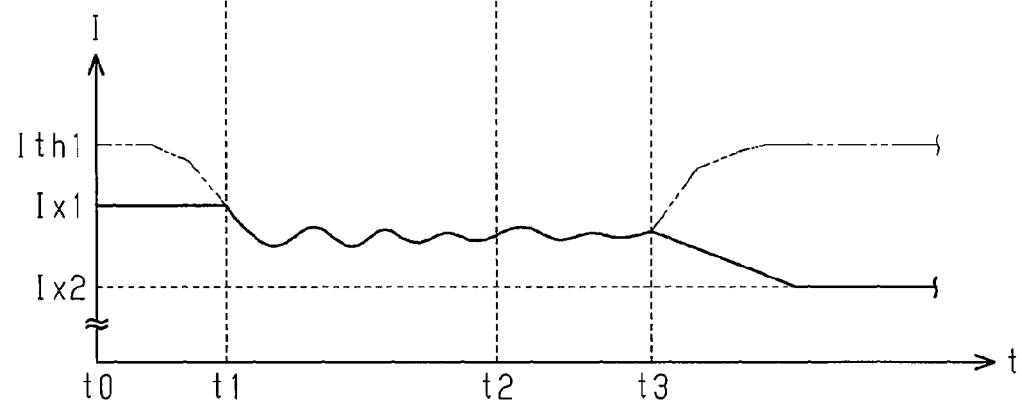
FIG. 5B is a schematic graph showing the motor current relative to time.
Figure 5C:
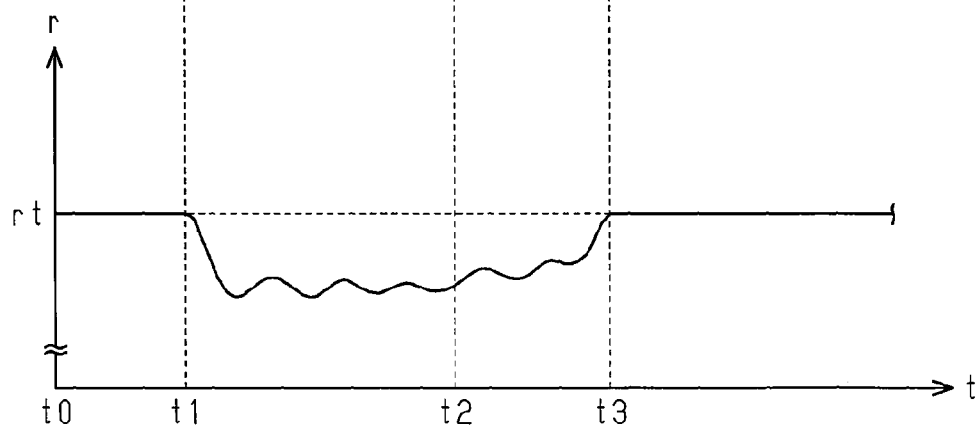
FIG. 5C is a schematic graph showing the rotation speed of an electric motor relative to time.

The operation of the present embodiment will now be described with reference to FIGS. 5A to 5C. FIG. 5A is a schematic graph showing the inverter temperature T relative to time. FIG. 5B is a schematic graph showing the motor current I relative to time. FIG. 5C is a schematic graph showing the rotation speed r of the electric motor 13 relative to time. In FIG. 5B, the motor current I is shown by the solid line, and the threshold current value Ith is shown by the broken line.

To facilitate understanding, a first load torque, which is the load torque during a period from timing t0 to timing t2, is greater than a second load torque, which is the load torque during a period from timing t2. In FIG. 5B, a first target current value Ix1 corresponds to the first load torque, and a second target current value Ix2 corresponds to the second load torque. Since the first load torque is greater than the second load torque, the first target current value Ix1 is greater than the second target current value Ix2. The target rotation speed rt is constant.

As shown in FIGS. 5A to 5C, the inverter temperature T is relatively low at timing t0. In this case, the motor current I is the first target current value Ix1, and the rotation speed r of the electric motor 13 is the target rotation speed rt. As shown in FIG. 5B, the threshold current value Ith is greater than the first target current value Ix1.

As shown in FIGS. 5A and 5B, when the inverter temperature T increases, the threshold current value Ith decreases. At timing t1, the threshold current value Ith becomes equal to the first target current value Ix1. Subsequently, the threshold current value Ith decreases as the inverter temperature T increases, and the motor current I accordingly becomes lower than the first target current value Ix1. In this case, when the generated torque becomes lower than the load torque, as shown in FIG. 5C, the rotation speed r of the electric motor 13 becomes lower than the target rotation speed rt. This balances the generated torque and the load torque.

When the motor current I decreases to a certain extent, the inverter temperature T starts to decrease. Then, as the threshold current value Ith increases, the motor current I increases. When the motor current I increases as the threshold current value Ith increases, the inverter temperature T increases again. Subsequently, as the threshold current value Ith decreases, the motor current I decreases. That is, the motor current I follows the threshold current value Ith, which changes in accordance with the inverter temperature T.

Accordingly, the inverter temperature T, the motor current I, and the rotation speed r of the electric motor 13 attenuates to approach an equilibrium value. In such a case, the waveforms of the motor current I and the rotation speed r of the electric motor 13 are substantially in phase, and the waveforms of the inverter temperature T, the motor current I, and the rotation speed r of the electric motor 13 are substantially in antiphase.

At timing t2, when the load torque starts to shift from the first load torque to the second load torque, which is lower than the first load torque, as shown in FIGS. 5B and 5C, the motor current I follows the threshold current value Ith, and the rotation speed r increases.

At timing t3, when the rotation speed r becomes equal to the target rotation speed rt, the motor current I starts to decrease from the threshold current value Ith to the second target current value Ix2, as shown in FIG. 5B. The second target current value Ix2 is set to the motor current I. In this case, as shown in FIG. 5A, when the motor current I starts to decrease, the inverter temperature T gradually decreases. Thus, as shown by the broken line in FIG. 5B, the threshold current value Ith gradually increases and then becomes fixed at the maximum threshold current value Ith1.

The present embodiment has the advantages described below.

(1) The control device 30, which drives and controls the electric motor 13 of the on-vehicle electric compressor 10, includes the temperature sensor 53 and the motor current detector 56 that detects the motor current I flowing through the electric motor 13. The controller 55 of the control device 30 uses the temperature sensor 53 to acquire the inverter temperature T, which serves as the temperature of the control device 30, and set the threshold current value Ith in accordance with the inverter temperature T. The controller 55 controls the motor current I to become less than or equal to the threshold current value Ith based on the detection result of the motor current detector 56. This limits excessive increases in the inverter temperature T (i.e., overheating of control device 30) in a preferable manner.

More specifically, as described above, the motor current I that equalizes the rotation speed r of the electric motor 13 with the target rotation speed rt changes in accordance with, for example, the load torque. Thus, even if the rotation speed r were to be decreased when the inverter temperature T increases, the motor current I may not decrease to a desired current value (threshold current value Ith) depending on the load torque. This may result in an excessively high inverter temperature T. Further, depending on the load torque, the motor current I may become too much lower than the threshold current value Ith, and the rotation speed r of the electric motor 13 may become lower than necessary.

In contrast, the present embodiment directly controls the motor current I in accordance with the inverter temperature T. Thus, the motor current I is controlled to be less than or equal to the threshold current value Ith regardless of the load torque. Thus, excessive increases in the inverter temperature T are limited regardless of changes in the load torque. This avoids a situation in which the electric motor 13 is stopped when the inverter temperature T becomes greater than the fifth threshold temperature T5. Further, the electric motor 13 may be operated for a longer period before being stopped by increasing the period required for the inverter temperature T to become greater than the fifth threshold temperature T5.

Further, the rotation speed r of the electric motor 13 is basically determined by the air-conditioning ECU 102. If the controller 55 were configured to control the rotation speed r, this would affect not only the control device 30 but also the entire system of the vehicle air conditioner 100 and complicate designing of the control device 30 and the vehicle air conditioner 100. In contrast, the subject of control is the motor current I in the present embodiment. Thus, designing of only the control device 30 (controller 55) is required, and the air-conditioning ECU 102 need only undergo a few design modifications. Further, the threshold current value Ith may be calculated relatively easily as compared to the acceleration rate or the like. Accordingly, the above advantage is achieved relatively easily.

(2) When the target current value Ix, which is the target value of the motor current I, is less than or equal to the threshold current value Ith, the controller 55 sets the target current value Ix to the motor current I. When the target current value Ix is greater than the threshold current value Ith, the controller 55 limits the motor current I at the threshold current value Ith. Thus, when the target current value Ix is less than or equal to the threshold current value Ith, the rotation speed r of the electric motor 13 may be controlled at the target rotation speed rt. This enables refrigerant to be discharged at a desired flow rate. When the target current value Ix is greater than the threshold current value Ith, the motor current I is limited at the threshold current value Ith. This limits excessive increases in the inverter temperature T that would stop the electric motor 13.

In the present embodiment, instead of the target current value Ix, the threshold current value Ith, which is the upper limit value of the motor current I, is set in accordance with the target current value Ix. This limits increases in the inverter temperature T while maintaining the rotation speed r of the electric motor 13 at the target rotation speed rt if possible.

More specifically, a configuration that controls the target current value Ix, not the threshold current value Ith, in accordance with, for example, the inverter temperature T is applicable to changes in the inverter temperature T. However, the target current value Ix is changed in accordance with the inverter temperature T. Thus, the rotation speed r of the electric motor 13 easily deviates from the target rotation speed rt.

In the present embodiment, the target current value Ix is changed in accordance with the target rotation speed rt and not in accordance with the inverter temperature T. When the target current value Ix is less than or equal to the threshold current value Ith, the target current value Ix is set to the motor current I. The motor current I is changed from the target current value Ix to the threshold current value Ith only when the motor current I needs to be limited (more specifically, when target current value Ix is greater than threshold current value Ith). This limits excessive increases in the inverter temperature T and avoids a situation in which the rotation speed r of the electric motor 13 is deviated from the target rotation speed rt due to the inverter temperature T.

(3) The controller 55 updates the threshold current value Ith in accordance with the inverter temperature T when the electric motor 13 generates rotation. The controller 55 controls the motor current I to be equal to the target current value Ix or the updated threshold current value Ith. Thus, the motor current I follows changes in the inverter temperature T when the electric motor 13 generates rotation. Accordingly, when the electric motor 13 generates rotation, the motor current I becomes close to the target current value Ix in a range that is less than or equal to the threshold current value Ith if possible.

(4) In particular, the threshold current value Ith is set based on the thermal properties of the components that form the inverter 31 (more specifically, power module 52). The threshold current value Ith is the upper limit value of the motor current I that is allowed at the present time (inverter temperature T). When the motor current I is equal to the threshold current value Ith, the control device 30 outputs the maximum current that can be output at the present time. Accordingly, the motor current I approaches the target current value Ix as close as possible in a range in which the inverter current T does not excessively increase.

(5) The controller 55 stops the electric motor 13 when the motor current I, which is detected by the motor current detector 56, is greater than or equal to the overcurrent determination value Is. This avoids a situation in which the electric motor 13 continues to operate with overcurrent flowing through the components that form the control device 30. The overcurrent determination value Is is a parameter that is set to be higher than the threshold current value Ith and set in correspondence with the threshold current value Ith so as to decrease as the threshold current value Ith decreases. This allows overcurrent to be coped with in a preferable manner More specifically, if the overcurrent determination value Is is set to a fixed value regardless of the threshold current value Ith, the difference in the threshold current value Ith and the overcurrent determination value Is may change greatly in accordance with the inverter temperature T. In such a case, when the difference is too large, the electric motor 13 may continue to operate regardless of the flow of overcurrent. If the difference is too small, the electric motor 13 may be erroneously stopped by the influence of noise or the like.

In the present embodiment, the overcurrent determination value Is is set to follow changes in the threshold current value Ith in accordance with changes in the inverter temperature T. This limits changes in the above difference and avoids undesirable situations that would be caused by such changes.

The differences in the control based on the overcurrent determination value Is and the control based on the threshold current value Ith will now be described. The overcurrent determination value Is is set based on the rated current value or the like of the components that form the inverter 31. Further, the overcurrent determination value Is is a parameter set separately from the threshold current value Ith. When the motor current value I is greater than or equal to the overcurrent determination value Is, excessive load is most likely applied to the components that form the inverter 31. This would immediately stop the electric motor 13.

The threshold current value Ith is a parameter that limits excessive increases in the inverter temperature T and is set to be lower than the overcurrent determination value Is. If the target current value Ix is greater than the threshold current value Ith, the electric motor 13 continues to operate with the motor current I limited at the threshold current value Ith. This avoids a situation in which the inverter temperature T becomes higher than the fifth threshold temperature which would stop the electric motor 13. As described above, the control based on the overcurrent determination value Is and the control based on the threshold current value Ith differ in the purpose and the control method of the electric motor 13.

(6) The threshold current value Ith is set to the maximum threshold current value Ith1, which is a fixed value, when the inverter temperature T is less than or equal to the first threshold temperature T1. When the inverter temperature T is greater than the first threshold temperature T1, the threshold current value Ith is set to decrease as the inverter temperature T increases. Thus, the threshold current value Ith is fixed to the maximum threshold current value Ith1 in a relatively low temperature range in which the inverter temperature T is less than or equal to the first threshold temperature T1. This facilitates setting of the threshold current value Ith.

The threshold current value Ith decreases as the inverter temperature T increases in a relatively high temperature range in which the inverter temperature T is higher than the first threshold temperature T1. Thus, the amount of heat generated by the power module 52 decreases as the inverter temperature T increases. This limits excessive increases in the inverter temperature T.

(7) The on-vehicle electric compressor 10 includes the housing 11, which accommodates the electric motor 13 and draws in refrigerant. This allows the electric motor 13 to be directly exposed to the refrigerant that is drawn into the housing 11. Thus, the electric motor 13 is cooled in a preferable manner.

In such a configuration, the control device 30 is coupled to the housing 11. This allows the control device 30 to be indirectly cooled by refrigerant through the housing 11. More specifically, the control device 30 includes the inverter 31, which supplies power to the electric motor 13, and the case 32, which accommodates the inverter 31. The case 32 is arranged at a location where the case 32 is thermally coupled to the housing 11. However, refrigerant does not flow into the case 32. Thus, the control device 30 (more specifically, inverter 31) is not directly exposed to the refrigerant. Accordingly, the control device 30 may be difficult to cool compared to when the electric motor 13 is directly exposed to the refrigerant.

In the present embodiment, the controller 55 of the control device 30 controls the threshold current value Ith based on the temperature (more specifically, inverter temperature T) of the control device 30 instead of the temperature of the electric motor 13. This protects the control device 30, which may be more difficult to cool than the electric motor 13, in a preferable manner.

It should be apparent to those skilled in the art that the present invention may be embodied in many other specific forms without departing from the spirit or scope of the invention. Particularly, it should be understood that the present invention may be embodied in the following forms.

The controller 55 may stop the electric motor 13 when the rotation speed r of the electric motor 13 is lower than a predetermined lower limit rotation speed. This avoids a situation in which the motor current I excessively increases when synchronism is lost in the electric motor 13.

More specifically, when the position acquisition unit 55a is configured to acquire the rotational position of the rotor 22 based on counter-electromotive force that is generated in the electric motor 13, the counter-electromotive force decreases as the rotation speed r of the electric motor 13 decreases. This increases the influence of noise that may increase the error in the acquired positon. In such a case, synchronism may be lost in the electric motor 13. When the electric motor 13 loses synchronism, the electric motor 13 interferes with the control of the motor current I. Thus, the motor current I may become higher than the threshold current value Ith and the overcurrent determination value Is. When the rotation speed r of the electric motor 13 is lower than the lower limit rotation speed, the electric motor 13 is stopped before losing synchronism. This limits overcurrent generated when the electric motor 13 loses synchronism.

In the present embodiment, the controller 55 is configured to control the motor current I at the threshold current value Ith or less based on the detection result of the motor current detector 56 when the electric motor 13 generates rotation. The above control may be executed when the electric motor 13 is activated in addition to when the electric motor 13 generates rotation. Alternatively, the controller 55 may execute the above control only when the electric motor 13 generates rotation.

The threshold current value Ith may be set in any specific form if the threshold current value Ith decreases as the inverter temperature T increases. For example, when the inverter temperature T is less than or equal to the first threshold temperature T1, the threshold current value Ith may be set to increase as the inverter temperature T decreases. Alternatively, when the inverter temperature T is greater than the first threshold temperature T1, the threshold current value Ith may be set to decrease at a constant gradient as the inverter temperature T increases. Further, the threshold current value Ith may be a step function in which the threshold current value Ith decreases as the inverter temperature T increases.

The controller 55 is configured so that the motor current I always becomes equal to the target current value Ix or the updated threshold current value Ith. However, the controller 55 does not have to be configured in such a manner. For example, when the threshold current value Ith becomes high after the motor current I is limited by the threshold current value Ith, the controller 55 may inhibit increases in the motor current I until the difference of the motor current I and the threshold current value Ith becomes equal to a predetermined specific amount or greater. Thus, the control device 30 is sufficiently cooled. This reduces changes in the motor current I and the rotation speed r. In this case, when the difference of the motor current I and the threshold current value Ith becomes equal to the predetermined specific amount or greater, the controller 55 limits the motor current I to the target current value or the threshold current value Ith.

In the further example, the controller 55 sets the updated threshold current value Ith to the motor current I when the motor current I is lower than the target current value Ix and the motor current I is higher than the updated threshold current value Ith.

The predetermined amount δI, which is the difference of the overcurrent determination value Is and the threshold current value Ith, may be a variable value for the inverter temperature T. Further, the overcurrent determination value Is may be a fixed value regardless of the threshold current value Ith.

The threshold current value Ith may be updated under any condition. For example, the threshold current value Ith may be updated under the condition that the inverter temperature T is changed by a predetermined specified temperature or greater.

The on-vehicle electric compressor 10 may include a sensor that detects the rotational position of the rotor 22. In this case, the on-vehicle electric compressor 10 does not have to include the position acquisition unit 55a.

The temperature sensor 53 may be arranged at any location. For example, the temperature sensor 53 may be arranged closer to the base 41 on the circuit board 51. Alternatively, the temperature sensor 53 may be arranged to contact the base 41 like the power module 52. When the location of the temperature sensor 53 (i.e., location of measuring temperature sensor 53) changes, the correlation of the measured temperature and the inverter temperature T may be changed. In this case, the controller 55 needs to acquire the correlation that corresponds to the above arrangement location in advance.

The control device 30 may be attached to the housing 11 at any location. For example, the control device 30 may be arranged on the outer surface of a portion opposing the outer circumferential surface of the stator 23 in the housing 11.

The on-vehicle electric compressor 10 and the control device 30 may be installed at any location in the vehicle. The on-vehicle electric compressor 10 and the control device 30 may be accommodated in any vehicle, for example, an electronic vehicle (EV) or a fuel cell vehicle (FCV) that does not include an engine.

Examples understood from the above embodiment and the modifications will now be described.

(A) Preferably, a target current value is changed in accordance with a target rotation speed and load torque but not in accordance with the temperature of a control device for an on-vehicle electric compressor.

(B) Preferably, an on-vehicle electric compressor includes a housing that accommodates an electric motor and draws in refrigerant, and the control device for the on-vehicle electric compressor is coupled to the housing.

(C) Preferably, a motor current controller executes control when the electric motor generates rotation.

(D) Preferably, the control device for the on-vehicle electric compressor includes a temperature stop controller that stops the electric motor when the temperature of the control device acquired by a temperature acquisition unit is higher than the predetermined stop trigger temperature.

The present examples and embodiments are to be considered as illustrative and not restrictive, and the invention is not to be limited to the details given herein, but may be modified within the scope and equivalence of the appended claims.

The invention claimed is:

1. A control device for an on-vehicle electric compressor, wherein the control device controls and drives an electric motor arranged in the on-vehicle electric compressor, the control device comprising:
 a temperature acquisition unit that acquires a temperature of the control device;
 a current detector that detects a motor current, which is current that flows through the electric motor;
 a threshold current value setting unit that sets a threshold current value in accordance with the temperature of the control device acquired by the temperature acquisition unit; and
 a motor current controller that controls the motor current based on a detection result of the current detector so that the motor current becomes less than or equal to the threshold current value, wherein the motor current controller controls the motor current to approach a target current value, which is a target value of the motor current, in response to the target current value being less than or equal to the threshold current value, the motor current controller limits the motor current at the threshold current value in response to the target current value being higher than the threshold current value, and when the threshold current value becomes high after the motor current is limited by the threshold current value, the motor current controller inhibits increases in the motor current until the difference of the motor current and the threshold current value becomes equal to a predetermined specific amount or greater.

2. The control device according to claim 1, wherein the threshold current setting unit updates the threshold current value in accordance with an acquisition result of the temperature acquisition unit when the electric motor generates rotation, and the motor current controller controls the motor current so that the motor current becomes equal to the target current value or the updated threshold current value.

3. The control device according to claim 1, further comprising a stop controller that stops the electric motor when the motor current detected by the current detector is greater than or equal to an overcurrent determination value, which is set to be higher than the threshold current value, wherein the overcurrent determination value is set to decrease as the threshold current value decreases.

4. The control device according to claim 1, wherein the threshold current value is set to a maximum threshold current value, which is a fixed value, when the temperature of the control device acquired by the temperature acquisition unit is less than or equal to a predetermined threshold temperature, and the threshold current value is set to decrease as the temperature of the control device increases when the temperature of the control device acquired by the temperature acquisition unit is higher than the threshold temperature.

* * * * *